(12) United States Patent
Purk et al.

(10) Patent No.: US 11,181,644 B2
(45) Date of Patent: Nov. 23, 2021

(54) METHOD AND APPARATUS FOR IMPROVED GNSS LOCATION DETECTION

(71) Applicant: GAS TECHNOLOGY INSTITUTE, Des Plaines, IL (US)

(72) Inventors: Thomas Purk, Palos Hills, IL (US); Steven Blitzstein, Highland Park, IL (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 222 days.

(21) Appl. No.: 16/212,975

(22) Filed: Dec. 7, 2018

(65) Prior Publication Data

US 2019/0302270 A1 Oct. 3, 2019

Related U.S. Application Data

(60) Provisional application No. 62/651,767, filed on Apr. 3, 2018.

(51) Int. Cl.
*G01S 19/09* (2010.01)
*G01C 9/00* (2006.01)

(52) U.S. Cl.
CPC .............. *G01S 19/09* (2013.01); *G01C 9/00* (2013.01)

(58) Field of Classification Search
CPC . G01C 9/00; G01S 19/09; G01S 19/20; G01S 19/215; G01S 19/23; G01S 19/24
See application file for complete search history.

(56) References Cited

U.S. PATENT DOCUMENTS

| 6,703,973 | B1 | 3/2004 | Nichols |
| 8,232,916 | B2 | 7/2012 | Kirk |
| 9,541,648 | B2 | 1/2017 | Ralphs et al. |
| 9,612,341 | B2 | 4/2017 | Large et al. |
| 10,338,228 | B2 | 7/2019 | Ashjaee |

(Continued)

FOREIGN PATENT DOCUMENTS

WO   WO 2014/055428 A2   4/2014

OTHER PUBLICATIONS

U.S. Patent Office, English language version of the International Search Report, Form PCT/ISA/210 for International Application PCT/US2019/22069, dated Jun. 11, 2019 (1 page).

(Continued)

*Primary Examiner* — Dao L Phan
(74) *Attorney, Agent, or Firm* — Pauley Erickson & Swanson (57) ABSTRACT

A method and apparatus for improving data quality using GNSS. The method is implemented through middleware for existing GNSS survey systems. The method and device automatically analyze streams of GNSS messages from a GNSS receiver mounted to a GNSS survey pole for preconfigured conditions and also automatically measure an angle or tilt of the GNSS survey pole. The middleware automatically locks onto a location point reading of the GNSS receiver when the GNSS survey pole is positioned in an acceptable vertical position, and any preconfigured conditions within the stream of GNSS messages are met. The middleware automatically repeats the GNSS message of the location point instead of the continuing live stream of data to enable a GIS or other system to collect the location point.

20 Claims, 4 Drawing Sheets

(56) References Cited

U.S. PATENT DOCUMENTS

| | | | |
|---|---|---|---|
| 2011/0287779 A1* | 11/2011 | Harper | H04W 4/025 |
| | | | 455/456.1 |
| 2014/0274031 A1* | 9/2014 | Menendez | G01S 19/48 |
| | | | 455/426.1 |
| 2018/0011200 A1 | 1/2018 | Ramamurthy et al. | |
| 2019/0154839 A1 | 5/2019 | Ashjaee | |

OTHER PUBLICATIONS

U.S. Patent Office, English language version of the Written Opinion of the International Searching Authority, Form PCT/ISA/237 for International Application PCT/US2019/22069, dated Jun. 11, 2019 (7 pages).

* cited by examiner

METHOD AND APPARATUS FOR IMPROVED GNSS LOCATION DETECTION

CROSS REFERENCE TO RELATED APPLICATION

This application claims the benefit of U.S. Provisional Patent Application Ser. No. 62/651,767, filed on 3 Apr. 2018. The provisional application is hereby incorporated by reference herein in its entirety and is made a part hereof, including but not limited to those portions which specifically appear hereinafter.

BACKGROUND OF THE INVENTION

Field of the Invention

This invention relates generally to Global Navigation Satellite Systems (GNSS) and, more particularly, to an apparatus and method for improving data quality and ease of use of GNSS and/or GIS systems.

Description of Related Art

In practice, GNSS receivers calculate a new point up to 20 times per second. The quality of the point, however, can change from good to bad and back to good several times per second. The change in quality can be caused by different factors including rapid changes in satellite reception and/or conditions or by procedural error(s) introduced by a user. For example, a user may decide to collect a point that seems high quality, but in the time it takes to make the motion to issue the "collect" or "save" command the point broadcast as a GNSS message may change.

In addition, as field data collection processes make greater use of and place greater reliance on technology 'gadgets,' users are more commonly burdened with operating several devices simultaneously. Unfortunately, a single individual oftentimes simply does not have enough hands to correctly operate all of the equipment in a manner that produces the optimal quality.

SUMMARY OF THE INVENTION

The invention includes a method and apparatus for improving, such as through smart automations, data quality from and ease of use of pole mounted GNSS antennas or systems.

Embodiments of this invention include a method of improving data quality using GNSS. The method includes automatically analyzing a stream of GNSS messages from a GNSS receiver for a preconfigured condition, and automatically filtering GNSS data received via the GNSS receiver as a function of the preconfigured condition. The filtering can include a locking onto a GNSS message when predetermined quality conditions are met. The filtered GNSS data, such as the locked GNSS message, is desirably automatically provided to a GIS system. The preconfigured condition(s) can include one or more of, for example, an angle or tilt of the GNSS receiver, number of satellites in solution, a distance root mean squared (DRMS) value, a horizontal dilution of precision (HDOP) value, and/or fix quality.

In accordance with one aspect of the invention there is provided an assembly, such as composed of an off-the-shelf battery powered microcomputer and sensor add-on with custom intelligent software loaded and a system for mounting to a standard GNSS survey pole. As detailed herein, the invention can desirably make field collection of GNSS locations easier and more accurate by eliminating user steps and potential user errors. The apparatus (e.g., software and/or hardware) and method of this invention generally operate as a middleware between a user's existing GNSS receiver and GIS mobile software, to intercept and/or filter GNSS standard messages. The GNSS messages are analyzed for preconfigured conditions while sensors measure the pole angle or tilt. When the pole is held vertical and conditions within the stream of GNSS messages are met, the middleware software and/or controller locks onto the point and repeats the point's GNSS message so that the GIS software can collect the point.

In one or more embodiments, the invention resolves issues regarding the quality of the point by using software based statistical and sensor analysis to lock onto a high quality point and then repeatedly broadcasts this point as a GNSS message in place of the live stream from the GNSS receiver.

Embodiments of this invention include a method of improving data quality using GNSS by automatically measuring an angle or tilt of a GNSS receiver; automatically filtering GNSS data received via the GNSS receiver as a function of the measured angle or tilt; and automatically forwarding filtered GNSS data to a GIS system. The method generally uses or operates on a device including a plumb or level sensor and a control module configured to receive the GNSS data, and automatically forwards the filtered GNSS data corresponding to a predetermined angle or tilt measurement taken or confirmed by the sensor. The method and/or device automatically determine an acceptable vertical position of the GNSS receiver, and automatically lock onto a location point reading of the GNSS receiver in the acceptable vertical position. The method and/or device desirably automatically repeat a GNSS message of the location point reading to the GIS system to enable collection of the location point. The repeated GNSS message replaces a live stream of continued GNSS data from the GNSS receiver, such that may occur after the receiver is no longer in the acceptable vertical position.

The invention further includes a method of improving data quality using GNSS by: automatically analyzing a stream of GNSS messages from a GNSS receiver mounted to a GNSS survey pole for preconfigured conditions, such as signal quality criteria; automatically measuring an angle or tilt of the GNSS survey pole; automatically locking onto a location point reading of the GNSS receiver when the GNSS survey pole is positioned in an acceptable vertical position and conditions within the stream of GNSS messages are met; and automatically repeating the GNSS message of the location point to enable a GIS system to collect the location point.

The invention further includes an apparatus for improving data quality in GNSS. The apparatus can be integrated within existing or new GNSS equipment, such as via a software add-on, or as an add-on middleware device for use in new or existing GNSS survey equipment systems. The apparatus of embodiments of this invention includes a housing with, or connectable to, a GNSS receiver having a GNSS antenna, a sensor that can determine an angle or tilt of the GNSS antenna, and a control module in combination with the sensor, wherein the control module analyzes and filters GNSS data from the GNSS receiver as a function of the angle or tilt of the GNSS antenna. The apparatus can further include a memory cache, wherein the control module automatically caches the filtered GNSS data, and/or a communication module that repeats a broadcast of the filtered GNSS data, wherein the repeating of the broadcast occurs regardless of any further angle or tilt of the GNSS receiver, and until cleared from the memory cache.

In one or more embodiments, the invention addresses the problem or burden of operating several devices simultaneously by altering the user's workflow, breaking it into sub-steps. For example, software logic and automation take over control of certain sub-steps in the workflow eliminating user introduced errors in those sub-steps. During the sub-steps the user is still responsible for, the user is required to operate fewer hardware devices because the invention has desirably already locked the GNSS point and the GNSS survey pole can be set aside so that the user can operate the mobile GIS software.

Other objects and advantages will be apparent to those skilled in the art from the following detailed description taken in conjunction with the appended claims and drawings.

DETAILED DESCRIPTION

As described in greater detail below, the invention generally relates to a method and apparatus for improving GNSS data gathering, with features termed as smart GNSS automations. In embodiments of this invention, the method and/or device provides automated determination of predetermined preferred use conditions, and filters the GNSS data (e.g., NMEA data) received via the GNSS receiver as a function of the conditions, such as locking a location point and its corresponding GNSS data upon determining the conditions are met. The preconfigured condition(s) can include one or more of, for example, an angle or tilt of the GNSS receiver and/or signal quality conditions such as number of satellites in solution, a distance root mean squared (DRMS) value, a horizontal dilution of precision (HDOP) value, and/or fix quality.

In embodiments of this invention, the device and method provide automated measuring of an angle or tilt of a GNSS receiver, and automated filtering of GNSS data received via the GNSS receiver as a function of the measured angle or tilt. By this invention, for example, the best location point information can be automatically coordinated to a sufficiently vertical position of the GNSS receiver, and the point reading only taken if the sufficient vertical position is obtained. User error in thus reduced or eliminated.

The smart GNSS automations of embodiments of this invention do not compensate for user error. Instead the subject helper automations encourage proper GNSS collection techniques which in turn produce or result in the highest quality data. The smart GNSS automations of the invention also do not introduce new 'gestures', but instead they intelligently monitor several factors and make an independent decision on when to collect a location point.

An additional advantage of the invention is that it can work with any GNSS device and/or mobile GIS software, such as those Bluetooth® compatible and/or which communicate via, for example, industry standard NMEA messages. Users of this system can keep their existing hardware and software. They do not need to buy a high end GNSS system or retrain on their personnel on the use of these systems.

Figure 1:
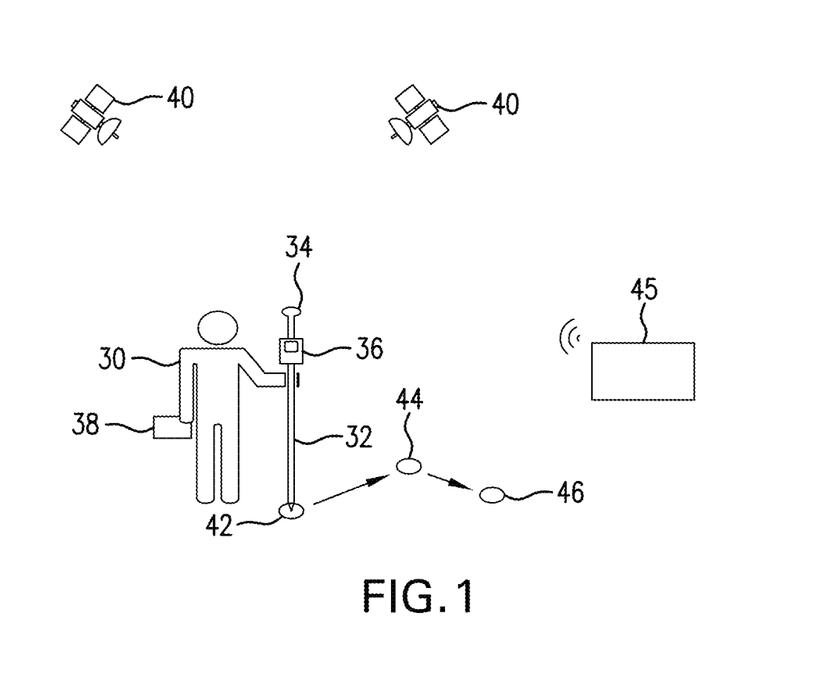
FIG. 1 representatively illustrates a surveying of a location point according to one embodiment of this invention.

FIG. 1 schematically illustrates a use of a GNSS receiver for point surveying, according to one embodiment of this invention. A user 30 has a GNSS survey pole 32 with a GNSS antenna 34 and a GNSS receiver 36 mounted thereon. The receiver 36 can alternatively be a hand-held unit or in some cases can even be a hand-held unit without a survey pole. The receiver 36 further includes an internal or external communications output (e.g., wired or wireless), antenna, or other equivalent for communicating with a GIS system 38 (e.g., a user tablet) and/or optionally transmitting to or receiving information from remote personnel and systems 45, such as by radio or cellular transmissions. The GNSS antenna 34 receives signals from GNSS satellites 40. The GNSS survey pole 32 is shown at a first location point 42. The user 30 places the tip of the survey pole 32 at the survey point 42, holds the pole 32 level (vertical) so that the center of GNSS antenna 34 is located over the survey point 42, and takes readings. The pole 32 is subsequently moved by the user 30 to further location points 44 and 46 during use for further measurements.

The GNSS receiver 36 of FIG. 1 includes a middleware according to embodiments of this invention for improving the accuracy of the location point determination. The middleware can be software stored in and/or executed by the GNSS receiver 36. The middleware can also be embodied via a separate device connected to the GNSS receiver 36 (e.g., wired or wireless), such as with a housing mounted to the pole 32 for user efficiency. As shown in FIGS. 5-13, a device of embodiments of this invention desirably includes a housing 52 with a display 54, and enclosing one or more sensors in combination with a control module. Any suitable sensors can be used, such as accelerometers, gyroscopes, degree of freedom sensors, etc. Ultrasonic or laser measurement can also be used. Additionally the device includes processors, non-transitory recordable memory components including executable software code and for data storage, such as a cache memory, and other computer components for operation and to implement the method of this invention.

Figure 2:
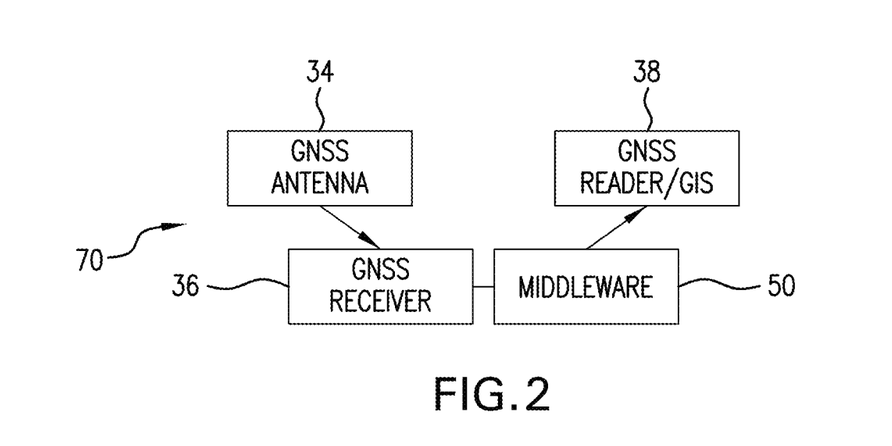
FIG. 2 shows a block diagram of a GNSS receiver system according to embodiments of this invention.

FIG. 2 shows a block diagram of a GNSS receiver system 70 according to embodiments of this invention. The GNSS antenna 34 sends satellite information to the receiver 36. Instead of the receiver transmitting the satellite information directly to the mapping system 45, such as a GIS system, the satellite information first goes through, and is filtered by middleware 50 (software and/or device) according to this invention.

Referring to FIG. 1, the user 30 places the pole 32 on survey point 42. When the middleware determines that the conditions are met, the middleware automatically locks onto a location point from the GNSS receiver. In presently preferred embodiments, the middleware uses or includes a plumb or level sensor that determines the orientation of the pole 32 relative to the vertical. When the middleware control module determines that the pole 32 is sufficiently close to vertical, according to a predetermined value, and any other preconfigured condition(s) is/are also met, the middleware locks onto a location point from the GNSS receiver. In embodiments of this invention, the device can lock a location point when the pole 32 is within any predetermined angle from vertical, such as 10% from vertical, desirably 5% from vertical, and preferably 0-2% from vertical.

In embodiments of this invention, the middleware replaces a continuing live stream of GNSS messages with a broadcast of the GNSS message of the locked location point, such as by with a repeated broadcast of the GNSS message of the locked location point. The middleware thereby filters the GNSS data provided to, for example, the downstream GIS system, by providing only the GNSS message of the desired, locked vertical position. The user 30 is thus relieved from maintaining the vertical orientation, thereby reducing user error and freeing the user to collect/input other information according to the job assignment. In embodiments of this invention, the device continues blocking the live stream and forwarding the repeated broadcast until the user clears the device for the next measurement.

Figure 3:
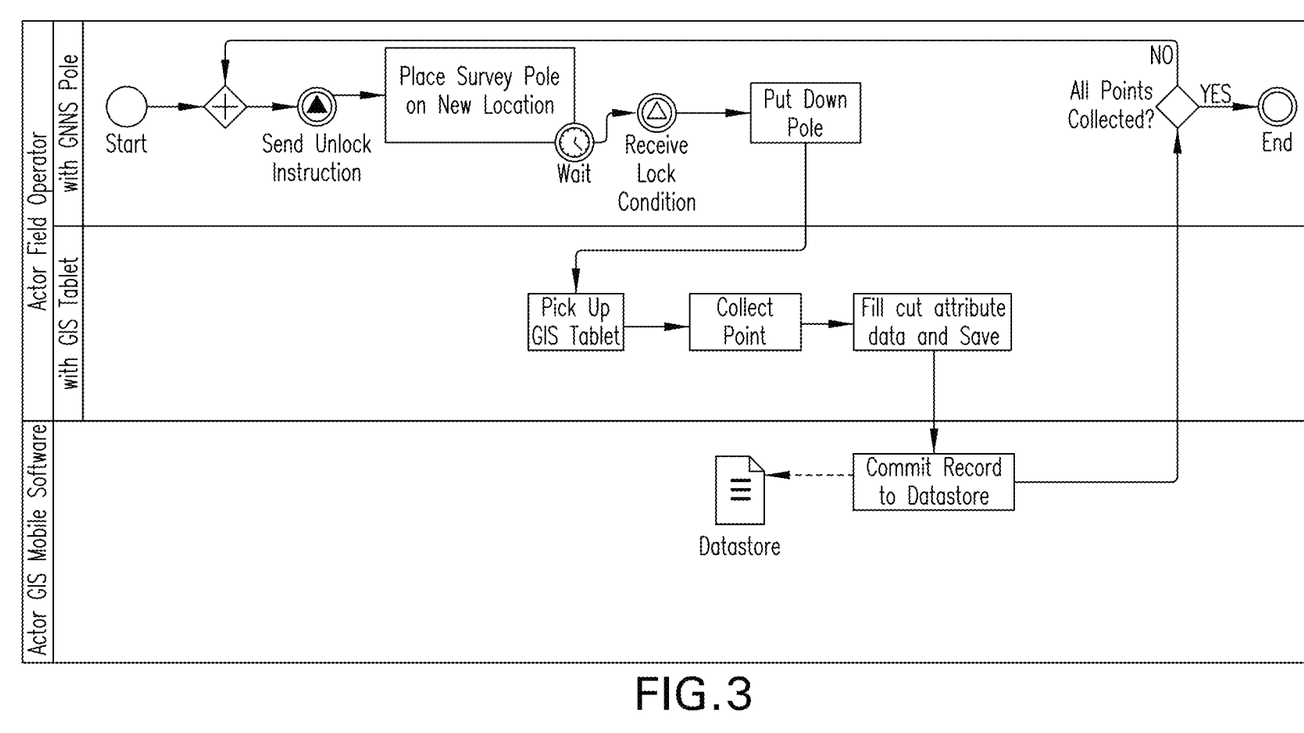
FIG. 3 is a flow diagram showing use of a device to collect GNSS point estimates according to one embodiment of this invention.
Figure 4:
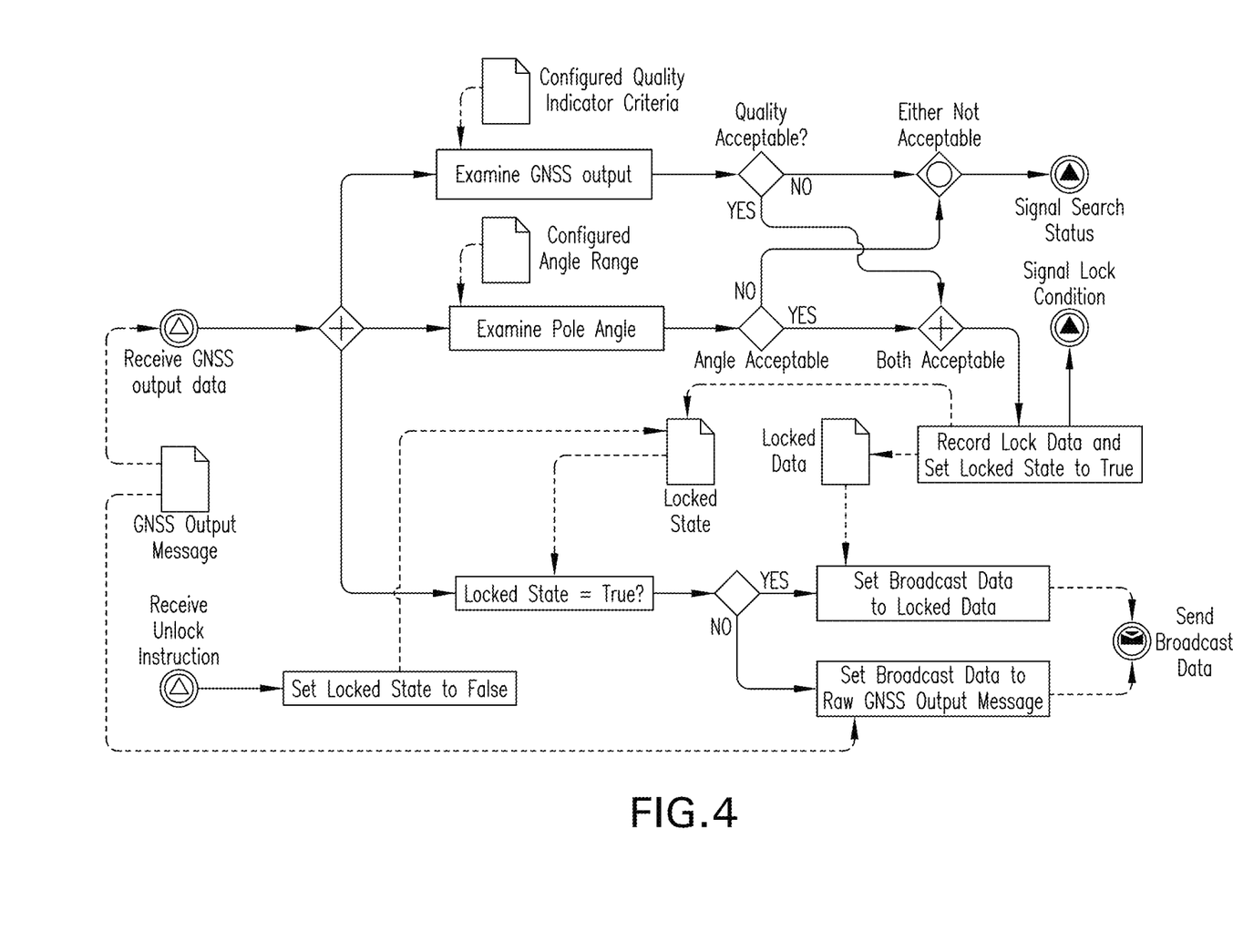
FIG. 4 is a flow diagram of the device locking a location point according to one embodiment of this invention.

As a further example of using the middleware to collect GNSS point estimates with more confidence that user introduced errors have been minimized, as illustrated in FIG. 3, the operation allows a field personnel to set aside a mobile data collection tablet, and focus on accurately placing the survey pole at the correct location. The field personnel instructs the middleware to unlock to clear any previous inadvertent lock, and the middleware desirably displays visual indicators of quality criteria status, such as including an electronic bubble level on a device display. The field personnel holds the survey pole plumb based on the electronic bubble level display. When all quality criteria are met, such as illustrated in FIG. 4, the middleware locks the point and caches in memory a segment of GNSS sentences containing the high quality positional data. The middleware intercepts the live GNSS stream coming from the GNSS device and instead repeatedly rebroadcasts the high quality GNSS stream cache. Upon seeing a confirmation of the lock on the display, the field personnel can set aside the survey pole and receiver, pick up the mobile data collection tablet, and focus on recording an accurate record within the mobile GIS software. Once the record has been recorded the field personnel can unlock the system so that it is ready to collect the next position.

Systems and assemblies in accordance with embodiments of the invention preferably satisfy at least one or more of the following functional requirements. The system desirably provides opportunities to improve quality of field location data collected using GNSS receivers. To achieve this, the system desirably automates appropriate steps of the collection process. The system desirably is able to sense the degree the pole is held out of plumb and provide the user some indication of the plumb status via visual display. The system desirably is able to intercept, for example, GST, GSA, GSV, and GGA type NMEA sentences via a connection (e.g., via a serial port) to a GNSS receiver. The system is desirably able to parse, without limitation, the following information from the NMEA messages: GST (latitude and longitude standard deviation values); GGA (current fix quality); GGA (horizontal dilution of precision (HDOP)); GGA (number of satellites); GSV (signal to noise ratio for satellite ID); and/or GSA (satellite IDs used). The system desirably detects when a segment of GNSS sentences has met any preconfigured quality indicators. The system desirably caches those high-quality messages and repeatedly send those message to the mobile tablet instead of the real-time GNSS being produced by the GNSS receiver. The system desirably allows the user to unlock the GNSS repeat mode via a button. The system desirably displays to the user in some visual manner such as a light, blinking light or icon the indicating status of the system and real-time status of quality components which trigger the hold point.

The system desirably enters a test mode on user request to validate the configured quality criteria. The test will be completed in area where the GNSS device can receive satellite signals and any required correction data. The test logic will validate that the GNSS is sending NMEA, for example, which make it possible to achieve a point lock. For example, if the quality configuration requires a RTK Fix, the test can look for RTK Float or Fix messages verifying that the GNSS is in RTK mode and receiving correction data. The system desirably supports a normal mode and a relaxed mode for quality configuration criteria. The user desirably is able to activate the relaxed mode for a single point at a time. The criteria categories desirably include one or more of: plumb level, valid NMEA, constellations in use, GST reported standard deviation, live sample 2DRMS, GGA fix quality, GGA HDOP, GGA number of satellites, and GSA to GSV SNR filter.

Desirable features and/or characteristics of the user interface include one or more of the following. The system desirably minimizes the number of devices that the operator needs to manage in the process of data collection. Any visual indicator desirably is visible in daylight conditions up to six feet away. Desirable performance requirements characteristics of the device include a rechargeable battery with a life that matches common GNSS receivers.

Interface requirement constraints for interactions with other systems, such as transferring data, may include one or more of the following. The system may desirably receive and transmit data via, for example, a serial port to and from a USB or Bluetooth connected GNSS device. The system desirably is able to receive NMEA or equivalent formatted messages from the GNSS. In some configurations, such as RTK operational modes, the system desirably is able to forward RTCM formatted correction messages to the GNSS device. The system desirably can receive and transmit data via, for example, a serial port to and from a USB or Bluetooth connected mobile tablet. The system desirably is able to send NMEA formatted messages to the mobile tablet. In some configurations, such as RTK operational modes, the system desirably is able to forward RTCM formatted correction messages from the mobile tablet. The system desirably provides hardware interfaces, for example R2 USB ver. 2.0 Type A, preferably with multiple connections to support connections to the GNSS equipment.

FIGS. 5-13 illustrate operations of a device 50 for implementing the middleware according to embodiments of this invention. The device 50 includes a housing 52 and a display screen 54. The display screen is used to communicate to the user whether the device (and survey pole) is level, and any other information relevant to the device and/or GNSS data gathering. As illustrated, the display screen includes an array (8×8) of individual LED lights 56, preferably each capable of more than one color. In FIGS. 5-13, the darkened circles represent illuminated lights 56.

Figure 5:
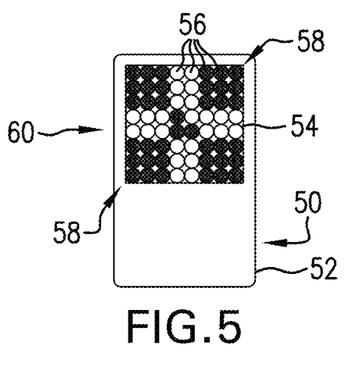
FIGS. 5-13 show an exemplary operation of a device according to one embodiment of this invention.
Figure 6:
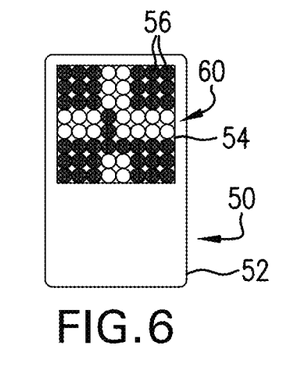
Figure 7:
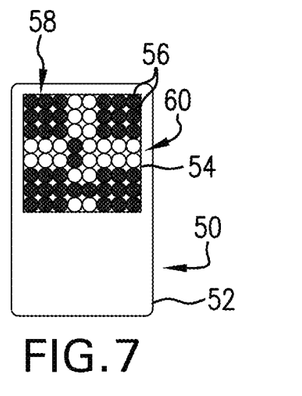
Figure 8:
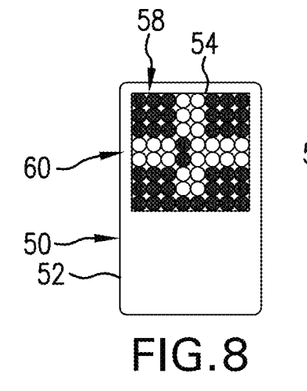
Figure 9:
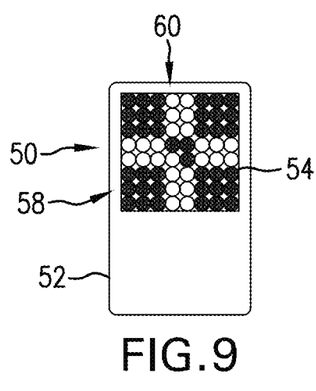
Figure 10:
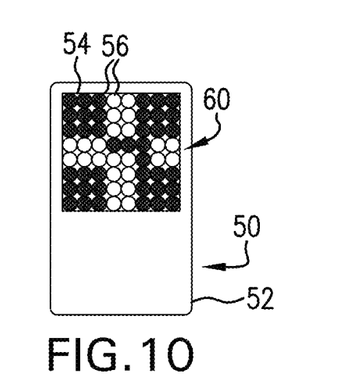
Figure 11:
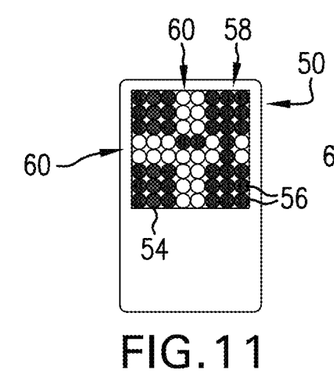
Figure 12:
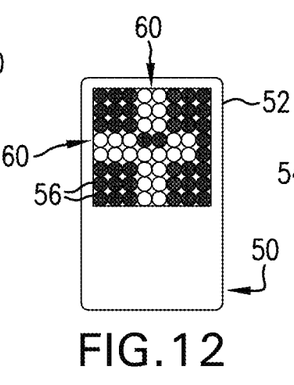

In the embodiment of FIGS. 5-13, the display 54 includes four corner quadrants 58 (3×3) that are illuminated, creating level-indicating light channels 60 therebetween. The internal control module of the device 50 communicates a plumb or level reading via the lights 56 on the display 54. FIG. 5 shows a display 54 when the survey pole is tilted five degrees from vertical, away from the user. In FIG. 6 the lights are illuminated further from a center of the array, and shows a display 54 when the survey pole is tilted ten degrees from vertical, away from the user. FIG. 7 shows a display 54 when the survey pole is tilted fifteen degrees from vertical, away from the user, and FIG. 8 shows a display 54 when the survey pole is tilted twenty or more degrees from vertical, away from the user. FIGS. 9-12 illustrate when the pole is tilted five, ten, fifteen, and twenty or more degrees, respectively, in a different direction to that of FIGS. 5-8, namely to the right of the user. Different colors can further be used in addition to the moving lights for ease of user recognition. For example, the displays of FIGS. 6 and 10 can use yellow lights to indicate a further distance from vertical, and FIGS. 7-8 and 11-12 can use red lights to indicate being very far from vertical.

Figure 13:
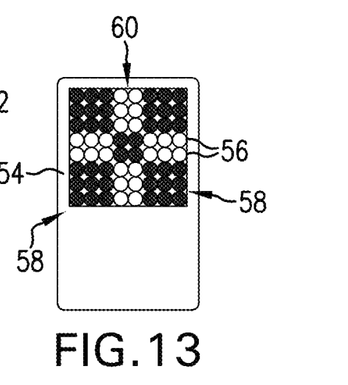

FIG. 13 shows the display 54 when the pole is held within an acceptable vertical position, such as two degrees level in both the left-right and front-back orientation. Additionally, the four quadrants can display colors, such as all four quadrants are green indicating that the current signal has met all quality criteria. In the orientation of FIG. 13, the system would lock the location point, and can show a lock icon. Additional or alternative sizes, shapes, or configurations are available to display the level sensor readings. For example, the four corner quadrants can change color (green-yellow-red) to indicate a vertical plumb position, or lack thereof, and/or whether other quality conditions are met. Also, a LCD or equivalent screen can be used and incorporate any suitable alphanumeric or pictorial level-indicating representation. Haptic or audible signals can be used alternatively or additionally. In addition, the display can include scrolling or other messages to the user, such as indicating normal vs. relaxed modes, signal fix issues, calibration or rest events/errors, or a location lock, such as displaying a padlock image.

Thus the invention provides a method, such as implemented in a middleware software or device for new or existing GNSS equipment, that allow for GNSS point collection in the GNSS software at a difficult location with less burden on the field user. A GNSS point estimate is collected in the GNSS software with more confidence that user-introduced errors have been minimized.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of improving data quality using GNSS, wherein a GNSS receiver receives signals from GNSS satellites and generates GNSS messages, the method comprising:
    automatically analyzing a stream of GNSS messages from the GNSS receiver for a preconfigured condition;
    automatically locking onto a location point reading of the GNSS receiver when the preconfigured condition is met;
    automatically filtering GNSS data received via the GNSS receiver as a function of the preconfigured condition; and
    automatically providing filtered GNSS data to a geographic information system ("GIS system"), wherein the filtering comprises automatically repeating the location point reading as the filtered GNSS data in a GNSS receiver broadcast to enable the GIS system to collect the location point.

2. The method of claim 1, wherein the preconfigured condition is selected from: an angle or tilt of the GNSS receiver, number of satellites in solution, a distance root mean squared (DRMS) value, a horizontal dilution of precision (HDOP) value, fix quality, or combinations thereof.

3. The method of claim 1, wherein the GNSS receiver is mounted to a GNSS survey pole, and further comprising:
    automatically measuring an angle or tilt of the GNSS receiver or GNSS survey pole; and
    automatically filtering GNSS data received via the GNSS receiver as a function of the measured angle or tilt.

4. The method of claim 3, further comprising:
    providing a device including a plumb or level sensor and a control module configured to receive the GNSS data; and
    automatically forwarding filtered GNSS data corresponding to a predetermined angle or tilt measurement.

5. The method of claim 1, further comprising:
    automatically determining an acceptable vertical position of the GNSS receiver; and
    automatically locking onto a location point reading of the GNSS receiver in the acceptable vertical position.

6. The method of claim 5, further comprising:
    automatically repeating a GNSS message of the location point reading to the GIS system to enable collection of the location point, wherein the repeated GNSS message replaces a live stream of GNSS data from the GNSS receiver.

7. The method of claim 1, wherein the filtering comprises repeating a GNSS message to the GIS system of a single locked location point determined as a function of the preconfigured condition.

8. The method of claim 1, further comprising:
    providing a device including a plumb or level sensor and a control module configured to receive the GNSS data;
    the device automatically determining an acceptable vertical position of the GNSS receiver via the sensor;
    upon determining the acceptable vertical position, the device automatically caching a segment of the GNSS data corresponding to the acceptable vertical position; and
    repeating a broadcast of the segment of the GNSS data, wherein the device intercepts and/or blocks a live GNSS stream while repeating the broadcast of the segment of the GNSS data, and/or the repeating of the broadcast occurs regardless of any further position of the GNSS receiver, and until cleared from a memory cache of the device.

9. A method of improving data quality using GNSS, wherein a GNSS receiver receives signals from GNSS satellites and generates GNSS messages, the method comprising:
    automatically analyzing a stream of GNSS messages from a GNSS receiver mounted to a GNSS survey pole for preconfigured conditions;
    automatically locking onto a location point reading of the GNSS receiver when the preconfigured conditions within the stream of GNSS messages are met to provide a locked location point reading; and
    automatically repeating a broadcast of a GNSS message of the locked location point reading of the GNSS receiver to enable a geographic information system ("GIS system") to collect the location point.

10. The method of claim 9, further comprising:
automatically measuring an angle or tilt of the GNSS survey pole;
automatically locking onto the location point reading of the GNSS receiver when the GNSS survey pole is positioned in an acceptable vertical position and conditions within the stream of GNSS messages are met.

11. The method of claim 9, wherein a repeated GNSS message replaces the stream of GNSS messages from the GNSS receiver to the GIS system.

12. A method of improving data quality using GNSS, the method comprising:
automatically analyzing a stream of GNSS messages from a GNSS receiver mounted to a GNSS survey pole for preconfigured conditions;
automatically locking onto a location point reading of the GNSS receiver when the preconfigured conditions within the stream of GNSS messages are met;
automatically providing a GNSS message of the location point to enable a geographic information system ("GIS system") to collect the location point; and
repeating the GNSS message of the location point regardless of any further position of the GNSS receiver until the GNSS message of the location point is cleared by a user.

13. The method of claim 9, wherein the steps are performed by a device including a plumb or level sensor and a control module configured to receive and analyze the GNSS messages, and the device is mounted to the GNSS survey pole.

14. The method of claim 13, further comprising:
the device automatically caching the GNSS message of the location point; and
the device repeating a broadcast of the GNSS message of the location point.

15. The method of claim 14, wherein the repeating of the broadcast occurs regardless of any further position of the GNSS receiver, until cleared from a memory cache of the device.

16. The method of claim 9, further comprising:
intercepting and/or blocking the stream of GNSS messages while providing the broadcast of the GNSS message of the location point.

17. The method of claim 4, wherein the device comprises a housing including or connectable to the GNSS receiver having a GNSS antenna, wherein the plumb or level sensor is within the housing, the sensor determines an angle or tilt of the GNSS antenna, the control module is in combination with the sensor, and the control module analyzes and filters the GNSS data from the GNSS receiver as a function of the angle or tilt of the GNSS antenna.

18. The method of claim 17, wherein the device further comprises a memory cache and a communication module, the method further comprising:
the control module automatically caching the filtered GNSS data; and
the communication module repeating a broadcast of the filtered GNSS data, wherein the repeats of the broadcast occur regardless of any further angle or tilt of the GNSS receiver, and until cleared from the memory cache.

19. The method of claim 1, further comprising:
repeating the location point reading regardless of any further position of the GNSS receiver until the filtered GNSS data is cleared from the GNSS receiver.

20. The method of claim 12, wherein the GNSS receiver is mounted to a GNSS survey pole, and further comprising:
automatically measuring an angle or tilt of the GNSS receiver or the GNSS survey pole, wherein the locking onto the location point reading is a function of the measured angle or tilt.

* * * * *